United States Patent
Young et al.

(10) Patent No.: US 10,019,791 B2
(45) Date of Patent: Jul. 10, 2018

(54) APPARATUS AND METHODS FOR ESTIMATING CORN YIELDS

(71) Applicant: RAYTHEON COMPANY, Waltham, MA (US)

(72) Inventors: Darrell L. Young, Falls Church, VA (US); Charlotte DeKeyrel, Leesburg, VA (US); Michael Henry Lewis, Leesburg, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/217,139

(22) Filed: Jul. 22, 2016

(65) Prior Publication Data

US 2017/0024876 A1     Jan. 26, 2017

Related U.S. Application Data

(60) Provisional application No. 62/196,393, filed on Jul. 24, 2015.

(51) Int. Cl.
G06T 7/00 (2017.01)
G06T 7/62 (2017.01)
G06Q 50/02 (2012.01)

(52) U.S. Cl.
CPC ........... G06T 7/0004 (2013.01); G06Q 50/02 (2013.01); G06T 7/62 (2017.01); G06T 2207/30128 (2013.01)

(58) Field of Classification Search
CPC .............. G06T 7/0004; G06T 7/62; G06T 2207/30128; G06Q 50/02

USPC ........................................................ 382/110
See application file for complete search history.

(56) References Cited

U.S. PATENT DOCUMENTS

| | | | |
|---|---|---|---|
| 6,646,264 B1 * | 11/2003 | Modiano | G01N 21/359 250/339.07 |
| 9,539,618 B2 * | 1/2017 | Alley | A01D 45/02 |
| 2016/0225135 A1 | 8/2016 | Young et al. | |
| 2016/0300363 A1 | 10/2016 | Young et al. | |
| 2016/0335477 A1 | 11/2016 | Young et al. | |

OTHER PUBLICATIONS

Roth, G., "Corn Yields and Kernel Size", Penn State Extension, Sep. 23, 2014, <URL: http://extension.psu.edu/plants/crops/news/2014/09/corn-yields-and-kernal-sizes>.
Blumenthal et al., "Estimating Corn Grain Yields", AgriLife Extension, Texas A&M System, Jun. 2009, pp. 1-6.
Corn Yield Estimator, Pioneer. Jul. 22, 2015. <URL: http//www.pioneer.com/home/site/ca/agronomy/tools/corn-yield-estimator>.

(Continued)

*Primary Examiner* — Amandeep Saini
(74) *Attorney, Agent, or Firm* — Lando & Anastasi, LLP

(57) ABSTRACT

A method for generating a yield estimate for a crop of corn includes capturing a digital image of an ear of corn; processing the digital image of an ear of corn to determine a plurality of dimensions for each of a plurality of kernels on the ear of corn; estimating, from the plurality of dimensions, an average kernel volume for the ear of corn; determining, from the average kernel volume and an estimated kernel density, an average kernel weight for the ear of corn; and estimating, from the average kernel weight, a kernels-per-bushel for the ear of corn.

19 Claims, 4 Drawing Sheets

(56) References Cited

OTHER PUBLICATIONS

Corn Loss Adjustment Standards Handbook, United States Department of Agriculture, Federal Crop Insurance Corporation, Nov. 25, 2013.
Nielsen, R.L., "Estimating Corn Grain Yield Prior to Harvest", Corny News Network, 2015 <URL: https://www.agry.purdue.edu/ext/corn/news/timeless/yldestmethod.html>.
Nielsen, R.L., "Ear Size Determination in Corn", Corny News Network, 1996, <URL: http//www.agry.purdue.edu/ext/corn/news/timeless/earsize.html>.

* cited by examiner

APPARATUS AND METHODS FOR ESTIMATING CORN YIELDS

RELATED APPLICATIONS

This application claims priority under 35 U.S.C. § 119(e) to U.S. Provisional App. No. 62/196,393, titled "MAIZE POINT YIELD USING CELL PHONE CAMERA AND CLOUD COMPUTING," filed Jul. 24, 2015, which application is incorporated herein by reference in its entirety.

BACKGROUND

An expected yield of corn is often estimated in bushels-per-acre; such estimates are often made by examining a small number of corn ears believed to be representative. Crop scouts typically estimate the number of kernels in $1/1000$ of an acre by estimating the average number of kernels per ear, then multiplying by the number of ears in $1/1000$ of an acre. To estimate the average number of kernels per ear, the number of kernel rows and average row length in kernels is averaged for several representative ears. The number of kernels per $1/1000$ of an acre is then obtained by multiplying the average number of kernels-per-ear by the number of ears counted in $1/1000$ of an acre. Finally, the number of kernels per $1/1000$ of an acre is then divided by an assumed number of kernels per bushel to get an estimated number of bushels-per $1/1000$ of an acre, which can be easily expressed as bushels per acre.

Such estimates are often inaccurate due to reliance on an assumed conversion constant of kernels-per-bushel. Some literature suggests using 90,000 kernels-per-bushel, but modern hybrids may have as few as 70,000 kernels-per-bushel due to larger kernel size. Using any fixed conversion factor leads to potential error. Other sources recommend estimating the number of kernels-per-bushel based on growing conditions, but this is circular logic since the point of doing the point yield estimate is to determine how well the corn is growing.

A crop farmer's livelihood is dependent upon yield, so accurate estimates are crucial for planning purposes. The impact of kernel size on yield estimates can be striking: a difference of only 0.06 grams per kernel can lead to a more than 20% swing in yield estimates.

There are two widely used methods for point yield prior to harvesting: the Yield Component Method, and the Pro Farmer Midwest Crop Tour Method. The Yield Component Method requires estimating the kernel-per-bushel based on whether growing conditions are "excellent," "average," or "poor." This method has drawbacks; for one, it employs somewhat circular logic, since the purpose of estimating the point yield is to determine how well the corn is growing—i.e., how favorable the growing conditions are. Characterizing growing conditions is also an inherently subjective exercise that introduces a potential bias into the estimate.

The Pro Farmer Midwest Crop Tour Method uses the length of the ear in inches as a proxy for the number of kernels in a row, and assumes the kernels-per-bushel (in thousands) is 0.345 of the row length in kernels. Yet potential ear length will vary dramatically from year to year as growing conditions vary. Stress can greatly reduce potential kernel number per row. Conversely, excellent growing conditions can encourage development of an unusually high number of kernels per ear. While the length of the ear is an important indicator, therefore, it can lead to inaccurate estimates.

SUMMARY OF THE INVENTION

Aspects and embodiments are directed to apparatus and methods for processing a digital image to determine average dimensions for the kernels on an ear of corn, then estimating, from those dimensions, an estimate of kernels per bushel. The kernels-per-bushel estimate can be combined with an ears-per-area (e.g., $1/1000$ acre) estimate to determine an estimated yield in bushels per acre.

According to one aspect, a method for generating a yield estimate for a crop of corn is provided. The method includes capturing a digital image of an ear of corn; processing the digital image of the ear of corn to determine a plurality of dimensions for each of a plurality of kernels on the ear of corn; estimating, from the plurality of dimensions, an average kernel volume for the ear of corn; determining, from the average kernel volume and an estimated kernel density, an average kernel weight for the ear of corn; and estimating, from the average kernel weight, a kernels-per-bushel measurement for the ear of corn.

According to one embodiment, processing the digital image of the ear of corn to determine the plurality of dimensions for each of the plurality of kernels on the ear of corn includes determining a width and a height of each of the plurality of kernels; and estimating, from the width and the height of each of the plurality of kernels, a depth of each of the plurality of kernels. According to a further embodiment, the method further includes determining an average width, an average height, and an average estimated depth of the plurality of kernels.

According to another embodiment, the method further includes estimating, from the digital image of the ear of corn, a first moisture content of the plurality of kernels. According to a further embodiment, the method further includes estimating an adjusted average kernel volume for the plurality of kernels having a second moisture content. According to a still further embodiment, the second moisture content is a moisture content associated with mature dried corn. According to a further embodiment, the second moisture content is approximately 15.5%.

According to one embodiment, the method includes capturing the digital image of the ear of corn to include a reference having known dimensions; and determining, based on the known dimensions of the reference in the digital image, at least one dimension of a kernel in the plurality of kernels. According to a further embodiment, the reference is a calibration card placed in the scene of the digital image with the ear of corn. According to a still further embodiment, the reference includes a grid pattern having the known dimensions. According to a further embodiment, the method further includes processing the digital image of the ear of corn and the calibration card using a threshold value to create a segmented binary image.

According to another embodiment, the average kernel volume is an average bounded kernel volume, and the method further includes estimating, from the average bounded kernel volume, an average actual kernel volume based on a conversion factor. According to a further embodiment, the average actual kernel volume is less than the average bounded kernel volume by a factor of approximately 3.

According to yet another embodiment, the method includes capturing the digital image using a camera of a mobile device. According to another embodiment, the method further includes estimating, from the digital image of the ear of corn, a number of kernels on the ear of corn; estimating a number of ears of corn in a sized location; and determining, from the number of kernels on the ear of corn and the number of ears of corn in the sized location, an estimated number of kernels in the sized location. According to a further embodiment, the method further includes determining, from the estimated number of kernels in the sized location, an estimated number of bushels of corn kernels in the sized location. According to a further embodiment, the sized location is a portion of a cornfield having an area of 0.001 acres.

According to another aspect, an image processing system is provided, the system including a memory, and a processor configured to process a digital image of an ear of corn to determine a plurality of dimensions for each of a plurality of kernels on the ear of corn; estimate, from the plurality of dimensions, an average kernel volume for the ear of corn; determine, from the average kernel volume and an estimated kernel density, an average kernel weight for the ear of corn; and estimate, from the average kernel weight, a kernels-per-bushel measurement for the ear of corn.

According to one embodiment, the system further includes an image capturing component, wherein the processor is further configured to capture the digital image of the ear of corn via the image capturing component. According to a further embodiment, the processor is further configured to estimate, from the digital image of the ear of corn, a number of kernels on the ear of corn; estimate a number of ears of corn in a sized location; and determine, from the number of kernels on the ear of corn and the number of ears of corn in the sized location, an estimated number of kernels in the sized location.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
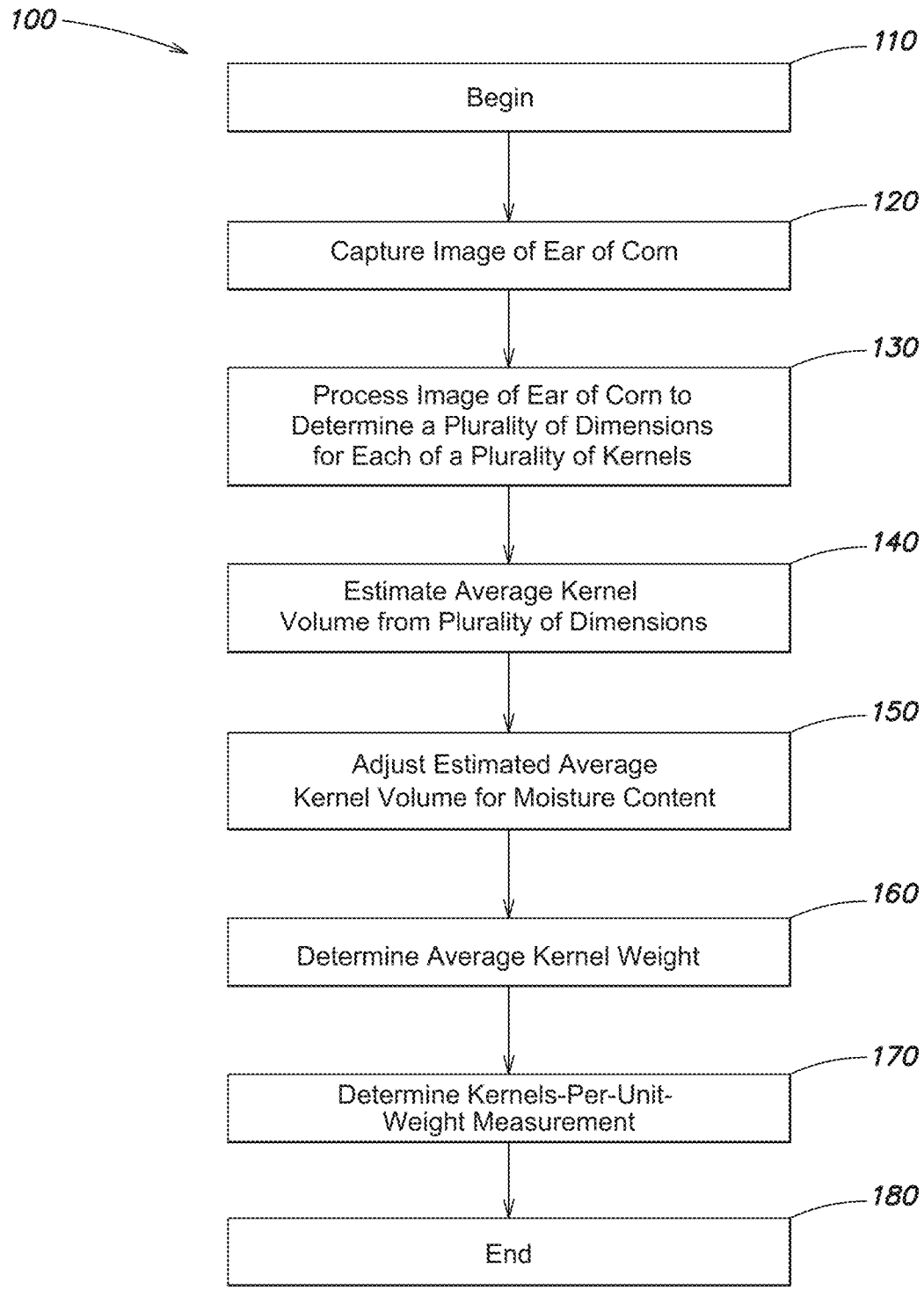
FIG. 1 is a flow diagram of one example of processing a digital image of an ear of corn to estimate kernel dimensions, according to aspects of the invention.

The number of kernels in a bushel of corn can be used, in conjunction with an estimate of the number of kernels in a particular unit area (e.g., 1/1000 of an acre) of a corn field, to estimate the yield of an area, for example, in terms of bushels per acre.

A method of determining the number of kernels per bushel is described. A yield estimate for a crop of corn can be generated by capturing an image of an ear of corn and determining the average volume of a kernel of corn from its dimensions. To do so, the dimensions of the kernel visible in the captured image (such as the length and width) may be measured, whereas dimensions not visible in the captured image (such as the depth of the kernel, or distance from the point where the kernel attaches at the ear to the opposing "top" surface of the kernel) may be estimated based on the visible dimensions or other factors.

The average dimensions of the kernels on the ear of corn can be used to determine an estimated average bounding volume (e.g., corresponding to a box just large enough to fit the kernel inside), which can in turn be converted to an estimated average actual volume based on observed characteristics of the kernels and similar kernels. For example, for kernels having a pyramid-like shape, the estimated average actual volume may be approximately 33% of the estimated average bounding volume. Because corn kernels generally shrink as they "dry down" to a commercially acceptable moisture content (e.g., 15.5%), the estimated average actual volume may also be adjusted based on current and target moisture contents of the kernels to account for further shrinkage as the corn continues to dry.

An average kernel mass or weight can be estimated from the estimated actual volume of and an observed or estimated density of the kernel using the relationship mass=density× volume. The number of kernels in a bushel of corn can be determined using the average kernel weight and a commercially accepted weight per bushel of corn (e.g., 56 pounds). For example, dividing the bushel weight of corn (e.g., in kilograms) by the average kernel weight (also in kilograms) gives an estimated number of kernels per bushel of corn.

In this manner, the number of kernels required to fill a bushel of corn can be estimated; the estimated number of ears of corn in an area of the field (e.g., an acre) can be determined using manual counting, overhead imagery, or other techniques described herein. Based on these estimates, an estimate of yield in terms of bushels per acre can be made for a particular corn crop or field, or portion thereof.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a flow diagram for one example of a method 100 for generating a yield estimate for a crop of corn.

Method 100 begins at step 110.

At step 120, an image of an ear of corn is captured. In some embodiments, a digital image of an ear of corn and/or the calibration card is obtained by a computer system, and preliminary processing is performed to generate a modified image to be used as input to subsequent steps. The image of the ear of corn may have been captured by a digital camera, or by a mobile device (e.g., a cell phone or tablet) with a camera and image-capturing capabilities. In other embodiments, the image is not directly captured, but may be received over a network, on a disk, or otherwise provided to the system for processing.

In some embodiments, the captured image also includes a size reference in the scene. For example, the captured image may be of the ear of corn placed next to a calibration card having at least one known dimension. In some embodiments, the size reference may have distance markers (e.g., $\frac{1}{16}$" marks along an edge) or other dimensional features (e.g., one or more geometric shapes or patterns of having at least one known dimension) to aid in determining the dimensions of other objects in the captured image (e.g., a kernel of corn). In other embodiments, commonly available objects having known dimensions (e.g., a dollar bill) may be used as a size reference. The size reference is identified in the captured image, and the dimensional features and/or the dimensions of the calibration card itself can be used to determine the size of the ear of corn and/or one or more kernels on the ear of corn in the captured image. In some embodiments, the pixel dimension (i.e., the number of pixels spanning a length to be measured) of the captured image can be determined relative to the size reference. For example, if a calibration card is 2" wide, the calibration card can be detected in the captured image as discussed below, and the number of pixels in the captured image spanning the width of the calibration card can be determined. A pixel count per unit distance (e.g., pixels per inch, or pixels per millimeter) can then be determined, allowing for the measurement in real units (inches, millimeters, etc.) of objects in the captured image based on their pixel dimension. In another example, a dollar bill may be used as a size reference, and a number of kernels along the long edge of the dollar bill may be determined from the captured image. A dollar bill has a length of 6.14 inches, so dividing 6.14 by the number of kernels along the edge of the dollar bill will give an estimated average kernel width for the plurality of kernels.

While a calibration card is discussed here for purposes of illustration, any object capable of provide a measurement reference may be used. In some embodiments, a calibration card is not used. The camera or mobile device capturing the image may be positioned a known distance from the ear of corn (e.g., through positioning by the operator and/or with a fixture or other method or component for establishing a fixed distance between two objects), thereby allowing the pixel count per inch (or other unit distance) of the captured image to be determined with of an object or region of the captured image may be estimated by the operator and input through a user interface or otherwise.

The size of the image may be validated or modified as necessary. For example, if the image is of too low a resolution, size, contrast, or sharpness, it may be assumed that the method cannot be performed on the image in a manner yielding sufficiently accurate results. As a result, an attempt to perform the method on an image having an inadequate resolution (e.g., less than 2 megapixels), size, contrast, or sharpness may be aborted by the system, and an error message may be displayed to the user indicating that the image is deficient, as well as information identifying the deficiency.

On the other hand, while digital cameras and devices are currently able to capture relatively high-resolution images, and typically do so by default, it may be determined in some embodiments that such high resolution is not necessary for performance of the method. Furthermore, the large file sizes associated with such high-resolution images typically require an unnecessary amount of time and resources to process. The image may therefore be downsampled to a lower resolution that reduces file size while still providing sufficient resolution for the image processing steps described herein. Downsampling the image to a standardized resolution may also simplify subsequent processing steps, as there would be no need to provide for the processing of images having different resolutions. In a preferred embodiment, the image may be downsampled to 2 megapixels. In other embodiments, the resulting resolution may be set by the system or a user, or may be determined at runtime by taking into account such factors as the file size, resolution, or dimensions of the original image, or the currently available processing bandwidth of the system.

The image may also be preliminarily processed to verify the existence and location of a probable ear of corn in the image. In a preferred embodiment, the image is processed to determine the texture of the image or a subset of pixels in the image. The texture of a region of an image may be understood as a function of the spatial variation in pixel intensities in that region. Regions having relatively high variations in pixel intensities may be visualized as "rough," whereas regions where pixel intensities are relatively homogeneous (i.e., have relatively low variations) may be considered "smooth." Texture analysis may allow an ear of corn to be detected in the image even where the characteristic of the corn or ambient conditions such as lighting make recognition of the ear by color or other characteristic unreliable or impossible.

According to some embodiments, the texture value of a particular pixel is determined by defining a region around the pixel and determining a texture statistic for that region, then assigning the texture statistic for that region as the texture value of the pixel. For example, the texture value of a pixel may be determined as the range (i.e., difference between high and low values) of pixel intensities for the region around the pixel. As another example, the texture value of a pixel may be determined as the standard deviation of pixel intensities for the region around the pixel. As yet another example, the texture value of a pixel may be determined as a function of the local entropy (i.e., randomness) of the region around the pixel. In one embodiment, a texture analysis function may be performed by the MATLAB package offered by The Mathworks, Inc., of Natick, Mass.

In other embodiments, the image is analyzed to locate a region matching the expected characteristics of a photograph of corn, such as a generally yellow to white color and an overall shape associated with ears of corn. In some embodiments, the image is converted to a multi-dimensional image format with dimensions (i.e., values) for lightness/tone and component colors. In a preferred embodiment, the image is converted to the Lab color space, with each pixel in the image a lightness dimension L and color dimensions a and b. One or more of the color dimensions of each pixel may be examined to determine if the pixel is within a target range of expected colors (e.g., yellow to whitish-yellow) associated with an ear of corn. An ear detection image may be generated. According to one embodiment, the ear detection image is a binary image, with pixels in the target range turned "on" (i.e., assigned a "high" value) and pixels not in the target range turned off. The resulting ear detection image may then be "smeared" by adjusting each pixel according to an averaged value of the surrounding pixels; doing so may reduce or eliminate any inconsistencies due to lighting or other conditions. If a blob in the ear detection image is detected that has an area within an expected range, appears in an expected region of the ear detection image, and/or appears in an expected orientation, the blob may then be assumed to be the ear of corn. If no blob meets those expectations, processing may be stopped, and an error message may indicate that no ear of corn was detected in the ear processing image.

To further streamline processing, the original down-sampled image can then be cropped to the region corresponding to the area where the ear of corn was detected in the ear detection image, resulting in an image substantially filled by the ear of corn. The image may also be straightened through rotation or other orientation change so that a centerline along the longitudinal axis of the ear is parallel to the upper and lower edges of the image. The image may also be resized to standardized dimensions to reduce the complexity of later processing steps. In one embodiment, the image is resized to 1400 pixels wide by 400 pixels high; however, numerous other image sizes can be used.

According to some embodiments, the captured image of the ear of corn is processed by thresholding the image to create a binary image (i.e., one in which each pixel is one of two colors, typically black and white). In particular, each pixel of the image is assigned a white value if the pixel's luminance value is higher than a given threshold luminance value, or a black value if the pixel's luminance value is lower than the given threshold luminance value. By selecting the optimal threshold, the image may be thresholded to create a binary image made up of a number of "blobs," or contiguous regions of similar colors or other values, with each blob corresponding to a kernel of corn. The more accurately the blobs reflect the shape and size of the photographed kernels, the more accurately identification and characterization of kernels by size and shape can be performed. In some embodiments, a binary image is not generated, and the corn kernels may be detected through other computer vision techniques.

At step 130, the captured image of an ear of corn is processed to determine a plurality of dimensions for each of a plurality of kernels on the ear of corn. In some embodiments, the visible dimensions of a plurality of kernels on the ear of corn are measured.

Figure 2A:
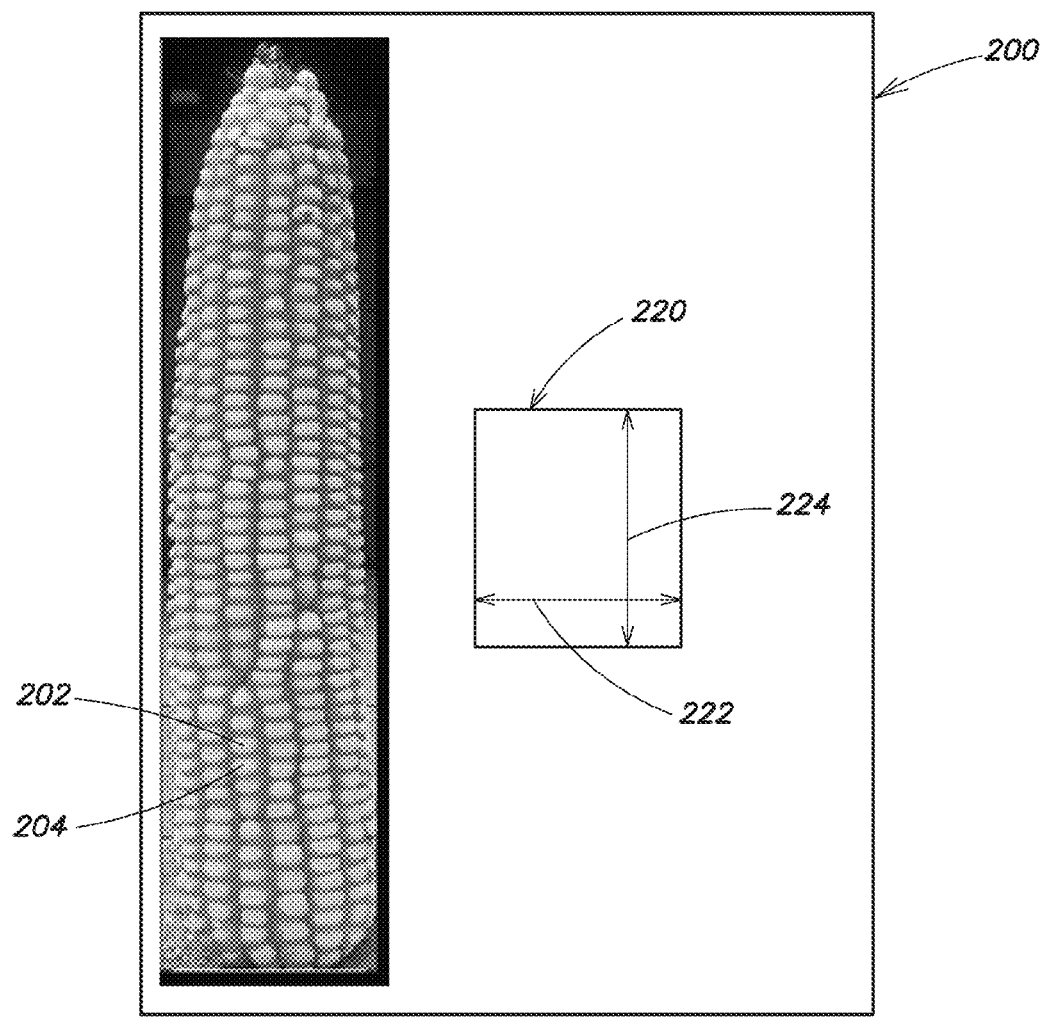
FIG. 2A illustrates an exemplary captured image of an ear of corn according to aspects of the invention.

FIG. 2A shows an exemplary captured image 200 of a calibration card 220 and an ear of corn having kernels 202 and 204. The calibration card 220 has dimensions including a width 222 and a height 224, both of which have known values. As discussed above, the known dimensions of the calibration card 220 can be used to determine a pixels-per-unit-length, such as a pixels-per-inch (PPI), of the captured image 200 for objects at approximately the distance of the calibration card 220 in the captured image 200, including the kernels on the ear of corn.

Figure 2B:
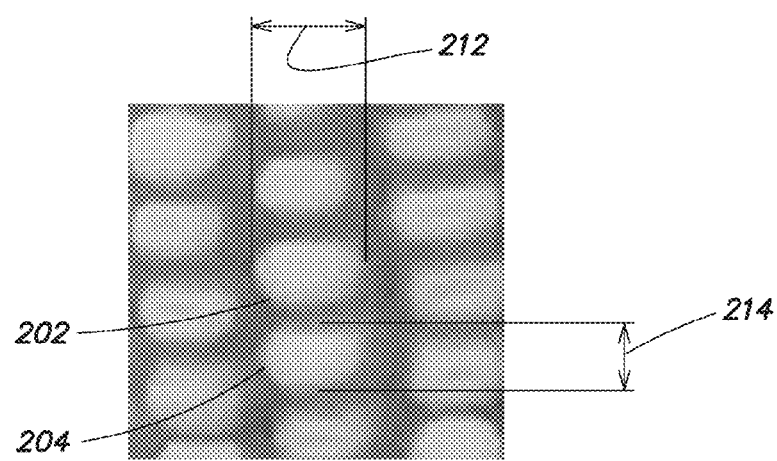
FIG. 2B illustrates enlarged details of the exemplary captured image of FIG. 2A.
Figure 3:
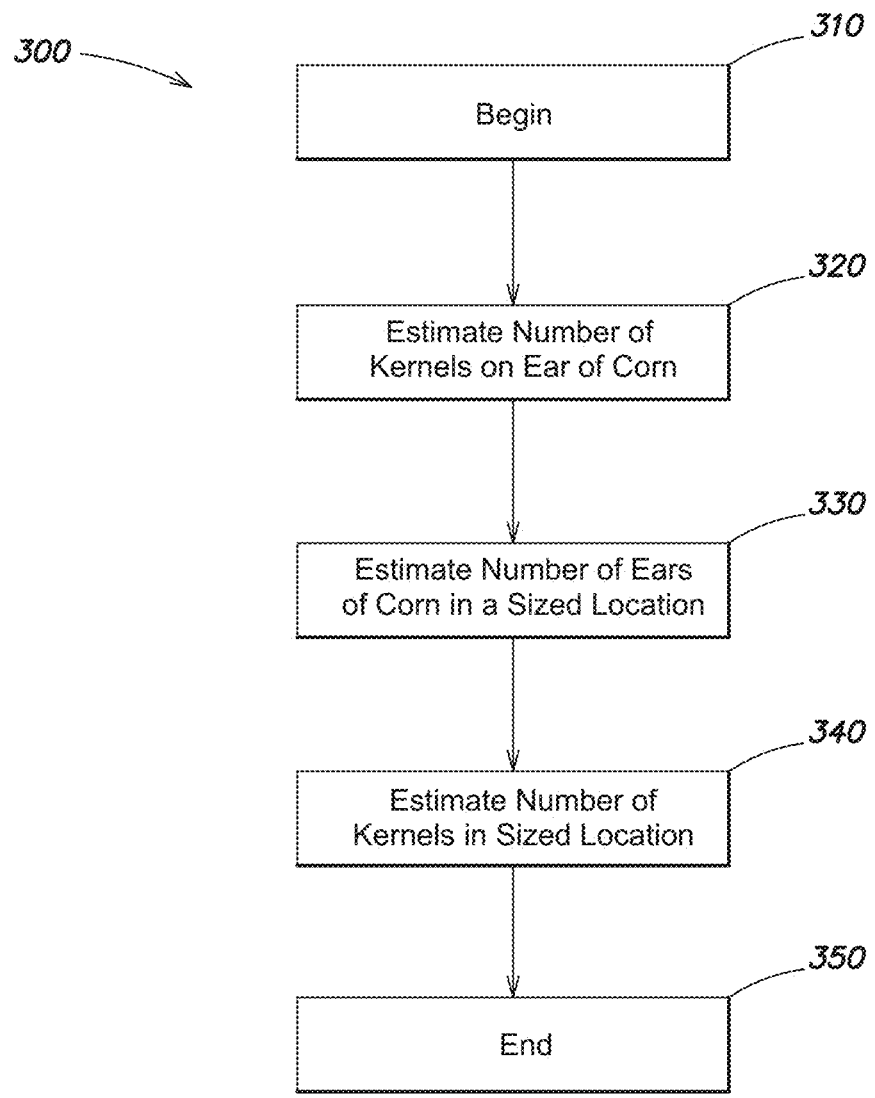
FIG. 3 is a flow diagram of one example of a process of estimating a yield of corn according to aspects of the invention.

FIG. 2B shows an enlarged region of the captured image 200 including kernels 202 and 204. Pixel dimensions of the kernels 202 and 204 can be determined from the captured image 200. For example, the width 212 of kernel 202 can be expressed as a number of pixels (e.g., 62) in the captured image 200, and the height 214 of the kernel 204 can be expressed as a number of determined from the blobs in the binary image, as discussed above. In other embodiments, other color or shape detection, computer vision, or other techniques may be employed.

The pixel width and pixel height dimensions of kernels can be converted into absolute measurements (for example, in inches) by dividing the pixel dimensions of a kernel by the PPI for the captured image, giving the absolute dimensions of the kernel in inches. In some embodiments, the depth of the kernels (i.e., the distance from the point where the kernel attaches at the ear to the opposing "top" surface of the kernel) is not visible in the captured image 200, but can be estimated from the measured width and height. In some embodiments, the dimensions of kernels may be assumed to be roughly proportional, and the depth of the kernel may be estimated as by multiplying the width and/or or height of the kernel. In some embodiments, the depth of a kernel may be estimated to be roughly 3× its height, and roughly 1.5 times its width; an average of those two results may be used for the depth of the kernel. In other embodiments, a fixed value may be used (e.g., 0.47 inches) as the estimated depth. In still other embodiments, one or more images may be captured from which the depth of the kernel can be observed directly. For example, an image may be captured of a cross section of the ear, or the non-tapered end of the ear.

Returning to FIG. 1, at step 140, an average kernel volume for the ear of corn is estimated from the plurality of dimensions. The average kernel volume may be derived, directly or indirectly, from the dimensions of the kernel determined in step 130, including the measured and/or estimated width, height, or depth. In some embodiments, an average rectangular bounding volume is determined by multiplying the average kernel width×average kernel height×average kernel depth. The average rectangular bounding volume can be adjusted by a factor (e.g., 50%) to estimate an average actual volume. In another embodiment, a kernel may be presumed to be generally pyramid-shaped, and the average actual volume may be estimated directly from the measured and/or estimated dimensions by the relationship (average kernel width×average kernel height× average kernel depth)/3.

In some embodiments, kernels having dimensions outside of an acceptable range may be excluded from calculating the average dimensions and/or average volume. Such outlier values may be a result of deformed kernels or lighting or other ambient conditions affecting the photograph.

At optional step 150, the estimated average kernel volume may be adjusted to take into account a current and target moisture content of the kernels. Corn is often harvested and stored when it is as close as possible to a (relatively low) 15.5% moisture content, because storing corn having a higher moisture content increases the risk of spoilage. Corn kernels generally shrink as they "dry down." If the estimated average kernel volume is determined in step 140 on corn having a relatively high moisture content, the estimated average kernel volume can be expected to be higher than the average kernel volume when the corn has adequately dried down. The estimated average kernel volume may therefore be adjusted to take into account this future shrinkage. Systems and methods for estimating moisture content from a captured image of an ear of corn are described in U.S. patent application Ser. No. 15/067,750, filed Mar. 11, 2016, titled, "APPARATUS AND PROCESSES FOR CORN MOISTURE ANALYSIS AND PREDICTION OF OPTIMUM HARVEST DATE", the contents of which are hereby incorporated by reference in their entirety. Such techniques can be used to estimate a current moisture content of the corn. The estimated average kernel volume determined in step 140 can then be adjusted based on the difference between the current moisture content and a target moisture content. In some embodiments, adjustment factors may be stored for a range of current moisture contents and/or target moisture contents, and may be applied as appropriate to the estimated average kernel volume to adjust for future shrinkage due to drying down.

At step 160, an average kernel weight for the ear of corn is determined from the average kernel volume and an estimated kernel density. Kernel density may be estimated (for example, by measuring the mass and volume of a number of test kernels), or may be assumed based on known characteristics of the corn, including strain, moisture content as described above, or otherwise. For example, the accepted bulk density of corn at 15.5% moisture content may be assumed to be 44.8 lb/ft$^3$. Densities at a range of moisture contents may be stored and accessed from a data store with the appropriate value selected and applied. The bulk density of corn includes the air between kernels, and in some embodiments, the bulk density is converted to a kernel density (which excludes the air between kernels) using a conversion factor. For example, kernel density may be assumed to be higher than the bulk density by a factor of 1.25.

Using the measured and/or estimated kernel density of the corn and the average kernel volume determined in steps 140 and/or 150, the average kernel weight can be determined as density×volume.

At step 170, a kernels-per-unit-weight measurement for the ear of corn is estimated from the average kernel weight. In some embodiments, a unit weight of a bushel is used. A bushel of corn is defined to be 56 pounds (25,424 grams) at 15.5% moisture. Dividing the bushel weight by the average kernel weight yields an estimated number of kernels per bushel.

Method 100 ends at step 180.

A working example using an embodiment of method 100 will now be described. In the working example, a dollar bill (having a length of 6.14 inches) was used as the size reference. An image was captured of an ear of corn adjacent the long edge of the dollar bill in the same scene, and the captured image was processed, including conversion to a binary threshold image, to determine the pixels of the captured image corresponding to the dollar bill. Dividing the number of pixels along one edge of the dollar bill by 6.14 inches gave a pixels-per-inch (PPI) measurement of approximately 436.

The mean length and width dimension in pixels of the kernels on the ear of corn were determined by measuring the dimensions of the blobs (i.e., kernels) in the binary threshold image. The mean kernel width was measured to be 161 pixels. Dividing by the PPI measurement of 436 yields 0.383 inches, or 9.38 mm mean kernel width. The mean kernel height was measured by counting approximately 34 kernels along the length of the dollar bill. Dividing 6.14 by the approximately 34 kernels and converting to metric gave a mean kernel height of 4.58 mm. A typical kernel depth of 12 mm was assumed.

Multiplying the width, height, and depth gave a bounding volume of the kernel of 9.38 mm×4.58 mm×12 mm=515.5 mm$^3$. An actual kernel volume can be expressed in terms of the bounding volume as 515.5 mm$^3$×$f_1$, where $f_1$ is a constant conversion factor between bounding volume and actual volume.

The ear of corn used in the working example was assumed to have a moisture content of 15.5%. The accepted bulk density of corn at 15.5% moisture is 44.8 lb/ft$^3$, where bulk density includes the air between kernels. The kernel density (which excludes the air between kernels) can be expressed in terms of bulk density as $f_2$×7.187×10$^{-4}$, where $f_2$ is a conversion factor between kernel density and bulk density.

Average kernel mass is determined as the product of average kernel density and average kernel volume, or (515.5 mm$^3$×$f_1$)($f_2$×7.187×10$^{-4}$). It has been observed that, at a given moisture content, $f_1$×$f_2$=0.90, allowing for average kernel mass to be determined as roughly 0.333 grams. A bushel of corn is defined to be 56 pounds (25,424 grams) at 15.5% moisture. Dividing that bushel weight by the estimated kernel weight gives the estimated number of kernels per bushel of 76,257.

A manual check was made of this estimate by taking a 200 gram sample of corn having a known moisture level of 22.8%; the sample was hand-counted and determined to contain 558 kernels. It was determined that at a target moisture level of 15.5%, the 200 grams of corn would have a reduced weight of 177.17 grams, or 0.3903 pounds. Extrapolation the sample weight to bushel weight gives an estimated kernel count per bushel of 558×(56/0.3903)=80,070 kernels per bushel. The count determined by the claimed methods differed from the manual count method by only 4.76%.

When an accurate estimated number of kernels per bushel can be determined (as in method 100) for a cornfield or a portion thereof, that number can be used to determine an estimated yield of a location (e.g., a cornfield or portion thereof) in terms of bushels per acre.

A method 300 for estimating a yield of corn begins at step 310.

At step 320, a number of kernels on one or more representative ears of corn is estimated. The representative ears of corn may include the ear used in method 100, or may be different ears of corn selected from representative spots in and/or around the location. Method and systems for estimating a number of kernels on an ear of corn is described in U.S. patent application Ser. No. 15/011,004, filed Jan. 29, 2016, titled "APPARATUS AND PROCESSES FOR CLASSIFYING AND COUNTING CORN KERNELS," the contents of which are hereby incorporated by reference in their entirety. Where a number of representative ears of corn are used, an average may be calculated to estimate an average number of kernels on an ear of corn in the location. In some embodiments, a weighted average may be calculated, with counts determined from ears having uniform, average-sized kernels given more weight.

At step 330, a number of ears of corn in a sized location may be determined, for example, by counting the number of plants in the sized location. Methods and systems for detecting ears of corn from overhead imagery are described in U.S. patent application Ser. No. 15/153,789, filed May 13, 2016, titled "APPARATUS AND PROCESSES FOR PHOTOSYNTHETIC ACTIVITY MEASUREMENT AND MAPPING," the contents of which are hereby incorporated by reference in their entirety. The techniques disclosed therein may be used to identify individual plants using image detection and thereby determine a count of the number of ears of corn in the location.

In some embodiments, the number of ears may be counted and entered manually, for example, on a mobile device. A GPS component may guide a user of the mobile device around an area of a defined size (e.g., 1/1000 acre), allowing the user to count the number of plants (i.e., ears) manually. In another embodiment, a user may be prompted to pace out a number of steps along a row of corn and count the number of ears along the way. The number, along with information about the distance between rows, may be used to estimate or extrapolate a number of ears of corn in the area.

At step 340, an estimated number of kernels in the sized location is determined from the number of kernels on the ear of corn and the number of ears of corn in the sized location. In particular, by multiplying the average number of kernels on an ear of corn in the sized location by the number of ears of corn in the sized location, the number of kernels in the sized location (e.g., the number of kernels per 1/1000 acre) can be determined. Dividing the number of kernels in the sized location by the average number of kernels in a bushel (as determined in method 100) gives an estimated number of bushels in the sized location, which in turn can be converted to be expressed in terms of a more suitable area unit, such as bushels per acre.

The method ends at step 350.

Figure 4:
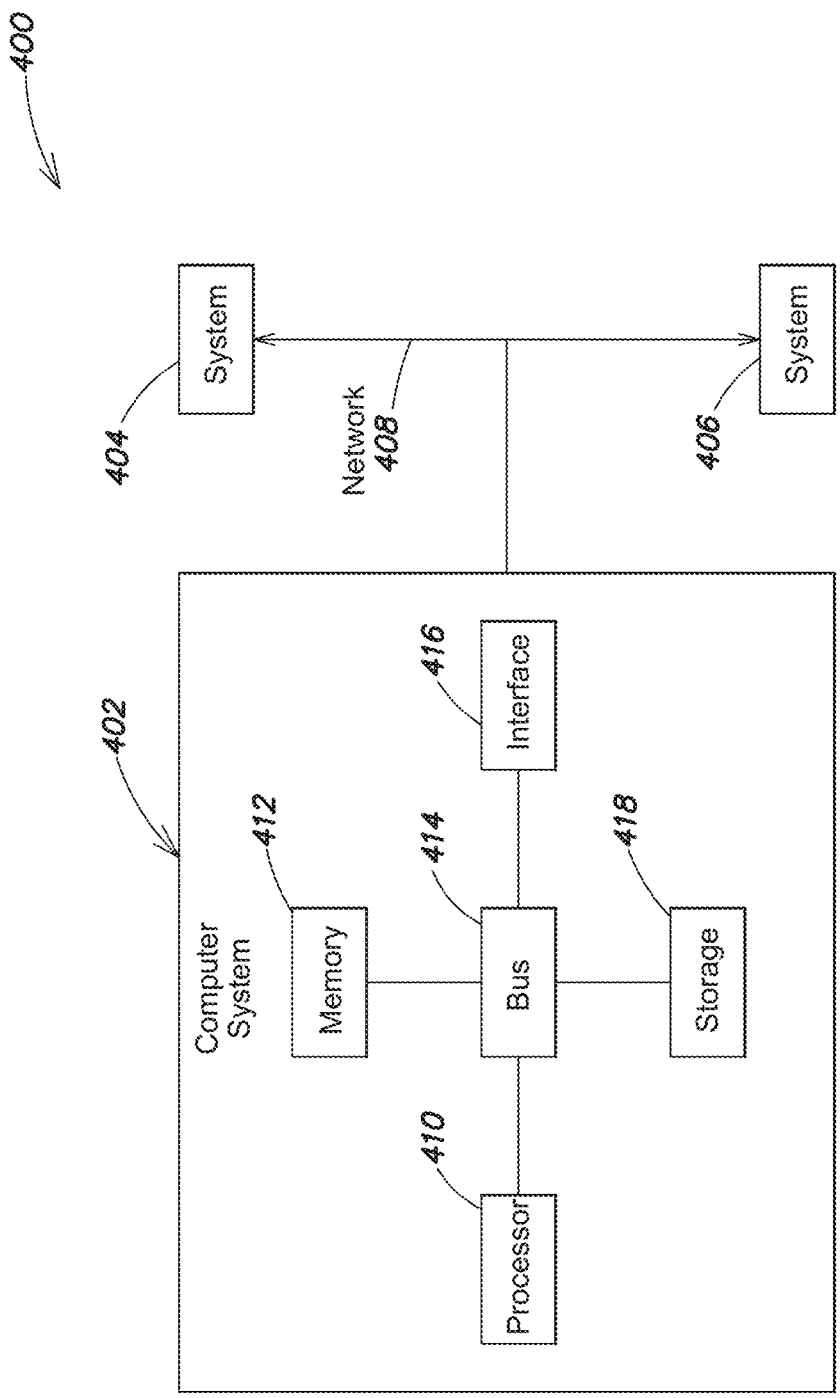
FIG. 4 is a block diagram of one example of a computer system on which aspects and embodiments of the present invention may be implemented.

FIG. 4 is a block diagram of a distributed computer system 400, in which various aspects and functions discussed above may be practiced. The distributed computer system 400 may include one or more computer systems. For example, as illustrated, the distributed computer system 400 includes three computer systems 402, 404 and 406. As shown, the computer systems 402, 404 and 406 are interconnected by, and may exchange data through, a communication network 408. The network 408 may include any communication network through which computer systems may exchange data. To exchange data via the network 408, the computer systems 402, 404, and 406 and the network 408 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for producing a three-dimensional synthetic viewpoint can be executed on computer systems 402, 404 and 406 individually and/or in combination. For example, the computer systems 402, 404, and 406 support, for example, participation in a collaborative network. In one alternative, a single computer system (e.g., 402) can generate the three-dimensional synthetic viewpoint. The computer systems 402, 404 and 406 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system 402 shown in FIG. 4. In one embodiment, computer system 402 is a personal computing device specially configured to execute the processes and/or operations discussed above. As depicted, the computer system 402 includes at least one processor 410 (e.g., a single core or a multi-core processor), a memory 412, a bus 414, input/output interfaces (e.g., 416) and storage 418. The processor 410, which may include one or more microprocessors or other types of controllers, can perform a series of instructions that manipulate data. As shown, the processor 410 is connected to other system components, including a memory 412, by an interconnection element (e.g., the bus 414).

The memory 412 and/or storage 418 may be used for storing programs and data during operation of the computer system 402. For example, the memory 412 may be a relatively high performance, volatile, random access memory such as a dynamic random access memory (DRAM) or static memory (SRAM). In addition, the memory 412 may include any device for storing data, such as a disk drive or other non-volatile storage device, such as flash memory, solid state, or phase-change memory (PCM). In further embodiments, the functions and operations discussed with respect to generating and/or rendering synthetic three-dimensional views can be embodied in an application that is executed on the computer system 402 from the memory 412 and/or the storage 418. For example, the application can be made available through an "app store" for download and/or purchase. Once installed or made available for execution, computer system 402 can be specially configured to execute the functions associated with producing synthetic three-dimensional views.

Computer system 402 also includes one or more interfaces 416 such as input devices (e.g., camera for capturing images), output devices and combination input/output devices. The interfaces 416 may receive input, provide output, or both. The storage 418 may include a computer-readable and computer-writeable nonvolatile storage medium in which instructions are stored that define a program to be executed by the processor. The storage system 418 also may include information that is recorded, on or in, the medium, and this information may be processed by the application. A medium that can be used with various embodiments may include, for example, optical disk, magnetic disk or flash memory, SSD, among others. Further, aspects and embodiments are not to a particular memory system or storage system.

In some embodiments, the computer system 402 may include an operating system that manages at least a portion of the hardware components (e.g., input/output devices, touch screens, cameras, etc.) included in computer system 402. One or more processors or controllers, such as processor 410, may execute an operating system which may be, among others, a Windows-based operating system (e.g., Windows NT, ME, XP, Vista, 7, 8, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for generating and manipulating images may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 402 is shown by way of example as one type of computer system upon which various functions for producing three-dimensional synthetic views may be practiced, aspects and embodiments are not limited to being implemented on the computer system, shown in FIG. 4. Various aspects and functions may be practiced on one or more computers or similar devices having different architectures or components than that shown in FIG. 4.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method for generating a yield estimate for a crop of corn, the method comprising:
   capturing a digital image of an ear of corn;
   comparing the digital image to a threshold value to create a segmented binary image;
   processing the segmented binary image of the ear of corn to determine a plurality of dimensions for each of a plurality of kernels on the ear of corn;
   estimating, from the plurality of dimensions, an average kernel volume for the ear of corn;
   determining, from the average kernel volume and an estimated kernel density, an average kernel weight for the ear of corn; and
   estimating, from the average kernel weight, a kernels-per-bushel measurement for the ear of corn.

2. The method of claim 1, wherein processing the segmented binary image of the ear of corn to determine the plurality of dimensions for each of the plurality of kernels on the ear of corn comprises:
   determining a width and a height of each of the plurality of kernels; and
   estimating, from the width and the height of each of the plurality of kernels, a depth of each of the plurality of kernels.

3. The method of claim 2, further comprising determining an average width, an average height, and an average estimated depth of the plurality of kernels.

4. The method of claim 1, further comprising estimating, from the digital image of the ear of corn, a first moisture content of the plurality of kernels.

5. The method of claim 4, further comprising estimating an adjusted average kernel volume for the plurality of kernels having a second moisture content.

6. The method of claim 5, wherein the second moisture content is a moisture content associated with mature dried corn.

7. The method of claim 6, wherein the second moisture content is approximately 15.5%.

8. The method of claim 1, further comprising:
   capturing the digital image of the ear of corn to include a reference having known dimensions; and
   determining, based on the known dimensions of the reference in the digital image, at least one dimension of at least one kernel in the plurality of kernels.

9. The method of claim 8, wherein the reference is a calibration card placed in a scene of the digital image with the ear of corn.

10. The method of claim 9, wherein the reference includes a grid pattern having the known dimensions.

11. The method of claim 1, wherein the average kernel volume is an average bounded kernel volume, further comprising:
    estimating, from the average bounded kernel volume, an average actual kernel volume based on a conversion factor.

12. The method of claim 11, wherein the average actual kernel volume is less than the average bounded kernel volume by a factor of approximately 3.

13. The method of claim 1, further comprising capturing the digital image using a camera of a mobile device.

14. The method of claim 1, further comprising:
    estimating, from the digital image of the ear of corn, a number of kernels on the ear of corn;
    estimating a number of ears of corn in a sized location; and
    determining, from the number of kernels on the ear of corn and the number of ears of corn in the sized location, an estimated number of kernels in the sized location.

15. The method of claim 14, further comprising determining, from the estimated number of kernels in the sized location, an estimated number of bushels of corn kernels in the sized location.

16. The method of claim 15, wherein the sized location is a portion of a cornfield having an area of 0.001 acres.

17. An image processing system comprising:
    a memory; and
    a processor configured to
       compare a digital image of an ear of corn to a threshold value to generate a segmented binary image;
       process the segmented binary image of the ear of corn to determine a plurality of dimensions for each of a plurality of kernels on the ear of corn;
       estimate, from the plurality of dimensions, an average kernel volume for the ear of corn;
       determine, from the average kernel volume and an estimated kernel density, an average kernel weight for the ear of corn; and
       estimate, from the average kernel weight, a kernels-per-bushel measurement for the ear of corn.

18. The system of claim 17, further comprising an image capturing component, wherein the processor is further configured to capture the digital image of the ear of corn via the image capturing component.

19. The system of claim 17, wherein the processor is further configured to:
    estimate, from the digital image of the ear of corn, a number of kernels on the ear of corn;
    estimate a number of ears of corn in a sized location; and
    determine, from the number of kernels on the ear of corn and the number of ears of corn in the sized location, an estimated number of kernels in the sized location.

* * * * *

UNITED STATES PATENT AND TRADEMARK OFFICE
CERTIFICATE OF CORRECTION

PATENT NO.        : 10,019,791 B2
APPLICATION NO.   : 15/217139
DATED             : July 10, 2018
INVENTOR(S)       : Darrell L. Young et al.

It is certified that error appears in the above-identified patent and that said Letters Patent is hereby corrected as shown below:

In the Specification

Column 5, in the paragraph that begins at Line 56 should be corrected to read:
While a calibration card is discussed here for purposes of illustration, any object capable of provide a measurement reference may be used. In some embodiments, a calibration card is not used. The camera or mobile device capturing the image may be positioned a known distance from the ear of corn (e.g., through positioning by the operator and/or with a fixture or other method or component for establishing a fixed distance between two objects), thereby allowing the pixel count per inch (or other unit distance) of the captured image to be determined with reference to the distance between the camera and the ear of corn. In other embodiments, the size of an object or region of the captured image may be estimated by the operator and input through a user interface or otherwise.

Column 8, in the paragraph that begins at Line 4 should be corrected to read:
FIG. 2B shows an enlarged region of the captured image 200 including kernels 202 and 204. Pixel dimensions of the kernels 202 and 204 can be determined from the captured image 200. For example, the width 212 of kernel 202 can be expressed as a number of pixels (e.g., 62) in the captured image 200, and the height 214 of the kernel 204 can be expressed as a number of pixels (e.g., 34). In a preferred embodiment, the pixel dimensions of the kernels can be determined from the blobs in the binary image, as discussed above. In other embodiments, other color or shape detection, computer vision, or other techniques may be employed.

Column 11, Line 45, delete "HOP" and insert -- IIOP --.

Signed and Sealed this
Second Day of October, 2018

Andrei Iancu
*Director of the United States Patent and Trademark Office*